(12) United States Patent
Takahata et al.

(10) Patent No.: US 9,059,436 B2
(45) Date of Patent: Jun. 16, 2015

(54) METHOD FOR PRODUCING LITHIUM ION SECONDARY BATTERY WITH TAP DENSITY AND ELECTRODE DENSITY

(75) Inventors: Koji Takahata, Toyota (JP); Hideki Sano, Daito (JP)

(73) Assignee: Toyota Jidosha Kabushiki Kaisha, Toyota-shi, Aichi (JP)

( * ) Notice: Subject to any disclaimer, the term of this patent is extended or adjusted under 35 U.S.C. 154(b) by 116 days.

(21) Appl. No.: 13/881,769

(22) PCT Filed: Oct. 27, 2010

(86) PCT No.: PCT/JP2010/069096
§ 371 (c)(1),
(2), (4) Date: Apr. 26, 2013

(87) PCT Pub. No.: WO2012/056532
PCT Pub. Date: May 3, 2012

(65) Prior Publication Data
US 2013/0212875 A1    Aug. 22, 2013

(51) Int. Cl.
*H01M 4/133* (2010.01)
*H01M 4/04* (2006.01)
(Continued)

(52) U.S. Cl.
CPC .......... *H01M 4/04* (2013.01); *Y10T 29/49115* (2015.01); *H01M 4/13* (2013.01);
(Continued)

(58) Field of Classification Search
CPC ................................ H01M 4/13; H01M 4/133
USPC ................ 429/231.4, 218.1, 231.8, 231.95
See application file for complete search history.

(56) References Cited

U.S. PATENT DOCUMENTS 6,399,251 B1 * 6/2002 Honbo et al. ............ 429/231.95
6,828,064 B1 * 12/2004 Nardi ............................ 429/232
(Continued)

FOREIGN PATENT DOCUMENTS

CN  1981393       6/2007
JP  10-334915    12/1998
(Continued)

OTHER PUBLICATIONS

ASTM B527-06, Standard Test Method for Determination of Tap Density of Metallic Powders and Compounds.*
(Continued)

*Primary Examiner* — Zachary Best
(74) *Attorney, Agent, or Firm* — Finnegan, Henderson, Farabow, Garrett & Dunner, LLP (57) ABSTRACT

A method for producing a lithium-ion secondary battery comprising positive and negative electrodes and a non-aqueous electrolyte solution is provided. The method comprises (A) with several different negative electrode active materials, determining density $X_n$ (g/cm$^3$) at several different number of taps applied, n, respectively; (B) determining density Y (g/cm$^3$) of a negative electrode active material layer constituted with a mixture comprising each negative electrode active material; (C) based on a regression line, $Y=aX_n+b$, determining the number of taps applied, n', that gives $a \le 0.5$ and a determination coefficient $R^2 \ge 0.99$; (D) based on a plot of $Y=aX_{n'}+b$, determining a passing range of $X_{n'}$ where negative electrode active material layer density Y is in a prescribed range; (E) selecting a negative electrode active material having $X_{n'}$ in the passing range, and fabricating a negative electrode with this material.

9 Claims, 3 Drawing Sheets (51) Int. Cl.
*H01M 4/13* (2010.01)
*H01M 4/139* (2010.01)
*H01M 4/587* (2010.01)
H01M 10/052 (2010.01)
H01M 10/0566 (2010.01)
H01M 4/02 (2006.01)
H01M 4/62 (2006.01)

(52) U.S. Cl.
CPC .............. *H01M 4/133* (2013.01); *H01M 4/139* (2013.01); *H01M 10/052* (2013.01); *H01M 10/0566* (2013.01); *H01M 2004/027* (2013.01); *Y02T 10/7011* (2013.01); *Y02E 60/122* (2013.01); *H01M 4/0404* (2013.01); *H01M 4/587* (2013.01); *H01M 4/622* (2013.01)

(56) References Cited

U.S. PATENT DOCUMENTS 7,943,084 B1 * 5/2011 Johnson et al. ................. 419/30
2007/0111102 A1 * 5/2007 Inoue et al. ................. 429/232
2008/0274406 A1 11/2008 Fuse et al.
2009/0130561 A1 * 5/2009 Matsumoto et al. ........ 429/231.8
2010/0176352 A1 * 7/2010 Chen et al. ................. 252/521.2

FOREIGN PATENT DOCUMENTS

| JP | 2000-223120 | 8/2000 |
|----|-------------|--------|
| JP | 2006-49288 | 2/2006 |
| JP | 2006-107896 | 4/2006 |
| JP | 2009-117240 | 5/2009 |
| JP | 2009-158105 | 7/2009 |

OTHER PUBLICATIONS

ASTM B527-06, Standard Test Method for Determination of Tap Density of Metallic Powders and Compounds (Oct. 2006).*

* cited by examiner

METHOD FOR PRODUCING LITHIUM ION SECONDARY BATTERY WITH TAP DENSITY AND ELECTRODE DENSITY

CROSS-REFERENCE TO RELATED APPLICATIONS

This application is a national phase application of International Application No. PCT/JP2010/069096, filed Oct. 27, 2010, the content of which is incorporated herein by reference.

TECHNICAL FIELD

The present invention relates to a method for producing a lithium-ion secondary battery.

BACKGROUND ART

A lithium-ion secondary battery comprises a positive electrode, a negative electrode, and an electrolyte present between these two electrodes; and charging and discharging are mediated by lithium ions in the electrolyte moving back and forth between the two electrodes. In general, its negative electrode is formed by applying and drying a paste or slurry negative electrode material on top of a current collector to form a negative electrode active material layer, and then subjecting the resultant to a rolling process, etc., as necessary. Technical literatures relating to negative electrodes for lithium-ion secondary batteries include Patent Documents 1 to 6.

CITATION LIST

Patent Literatures

[Patent Document 1] Japanese Patent Application Publication No. 2006-49288
[Patent Document 2] Japanese Patent Application Publication No. 2006-107896
[Patent Document 3] Japanese Patent Application Publication No. 2009.117240
[Patent Document 4] Japanese Patent Application Publication No. H10-334915
[Patent Document 5] Japanese Patent Application Publication No. 2000-223120
[Patent Document 6] Japanese Patent Application Publication No. 2009-158105

SUMMARY OF INVENTION

Technical Problem

Use of lithium-ion secondary batteries has been expanding in various fields, and improvement and stabilization of their properties are desired. Thus, it is useful to provide a negative electrode that gives rise, in a battery; to effects such as a suppressed internal resistance increase and so on. According to the investigations by the present inventor, however, it has been difficult to control the properties of negative electrodes and constantly produce lithium-ion secondary batteries wherein an increase in the internal resistance is effectively suppressed.

One objective of the present invention is to provide a method for stably producing a lithium-ion secondary battery in which an increase in the internal resistance is suppressed.

Another objective is to provide a lithium-ion secondary battery produced by such a method.

Solution to Problem

The present inventor recognized that the density of a negative electrode active material had an important effect on the negative electrode properties. The present invention was made upon discovery of a method that enables control of the density of a negative electrode active material layer (typically, the density of a negative electrode active material layer formed by applying and drying on top of a prescribed surface a negative electrode material mixture comprising a negative electrode active material powder and a solvents with higher accuracy.

The art disclosed herein provides a method for producing a lithium-ion secondary battery comprising a positive electrode, a negative electrode, and a non-aqueous electrolyte solution. The method comprises the following steps:

(A) with respect to several different negative electrode active materials, determining tap density $X_n$ (g/cm$^3$) at several different number of taps applied, n, respectively;

(B) determining density Y (g/cm$^3$) of a negative electrode active material layer constituted with a negative electrode material mixture comprising each negative electrode active material (typically, the density of a negative electrode active material layer formed by applying and drying on top of a prescribed surface a negative electrode material mixture comprising a negative electrode active material powder and a solvent);

(C) based on a regression line of Y versus tap density $X_n$, $Y=aX_n+b$, determining the number of taps applied, n', at which the regression line has a slope, a, of 0.5 or smaller and a coefficient of determination, $R^2$, of 0.99 or larger;

(D) based on a plot of a regression line $Y=aX_{n'}+b$ for the number of taps applied, n', determining a passing range $X_{n'}$ of within which negative electrode active material layer density Y is in a prescribed range;

(E) selecting a negative electrode active material having a $X_{n'}$ in the passing range, and fabricating a negative electrode with the negative electrode active material; and (F) constituting a lithium-ion secondary battery using the negative electrode.

In the method disclosed herein, when fabricating a negative electrode, among negative electrode active materials (typically as powders) each with the tap density $X_n$ and the density Y of the resulting negative electrode active material layer showing a relationship represented by a regression line $Y=aX_n+b$ where a ≤0.5 and $R^2 \geq 0.99$, a negative electrode active material having a tap density $X_{n'}$ that gives rise to a negative electrode active material layer density Y in a prescribed range is selected and used as the negative electrode active material. Lithium-ion secondary batteries comprising such a negative electrode may show smaller deviations (a deviation in every battery) in the negative electrode active material layer density. This allows more stable attainment of target battery properties.

In the art disclosed herein, the passing ranges of n, Y, n' and $X_{n'}$ in the respective steps (A), (B), (C) and (D) can be determined by taking measurements or obtaining plots anew every time when the method is practiced; applying past results (past measurement results or plots obtained in the past, etc.); applying information (numerical values or numerical ranges) provided by the manufacturer or the seller; or other means. In the step (A), several different negative electrode active materials mean to include, for instance, materials having different compositions from each other materials produced by different methods; materials having different catalog properties (average particle diameter, etc.); and also those of the same material (catalog number, etc.), but different production lots; and so on.

The production method disclosed herein can be preferably applied when, for instance, the rolling process (a pressing step) for the negative electrode (e.g., a negative electrode sheet) is omitted for cost reduction and so on. According to the production method disclosed herein, as described above, because a negative electrode active material capable of realizing a prescribed negative electrode active material layer density is selected for use, when fabricating a negative electrode, even if a pressing step for adjusting (equalizing) the negative electrode active material layer density is omitted, deviations in the negative electrode active material layer density are small. In a preferable embodiment; deviations in the negative electrode active material layer density can be suppressed to a level more or less equal to density deviations among negative electrode active material layers that have undergone a pressing step. This allows stable production of lithium-ion secondary batteries wherein increases in the internal resistance (direct-current resistance, reaction resistance) caused by negative electrode properties are effectively suppressed. According to such a production method, when negative electrode active materials that are the same material wise (product number, etc.) but are of different production lots are used, it is possible for batteries obtained from these negative electrode active materials of different lots to have smaller deviations in the properties (e.g., deviations in the capacity retention rate after storage at a high temperature, etc.), with the deviations arising due to interlot variation in the physical properties among the negative electrode active materials used.

In a preferable embodiment, the prescribed range of Y in the step (D) is center value Y'±0.1 g/cm$^3$. For instance, it is more preferable that the prescribed range of Y is 0.85 g/cm$^3$ to 1.05 g/cm$^3$ (i.e., Y' in Y'±0.1 g/cm$^3$ is 0.95). In another preferable embodiment, the number of taps applied, n', in the step (C) is 140 to 200. For instance, it is suitable that n' is 200. In yet another preferable embodiment, the passing range of $X_{n'}$ is 0.6 g/cm$^3$ to 0.95 g/cm$^3$. Such a production method can be preferably applied when employing an embodiment (embodiment without pressing) where a pressing step is not carried out during the negative electrode fabrication.

Figure 3:
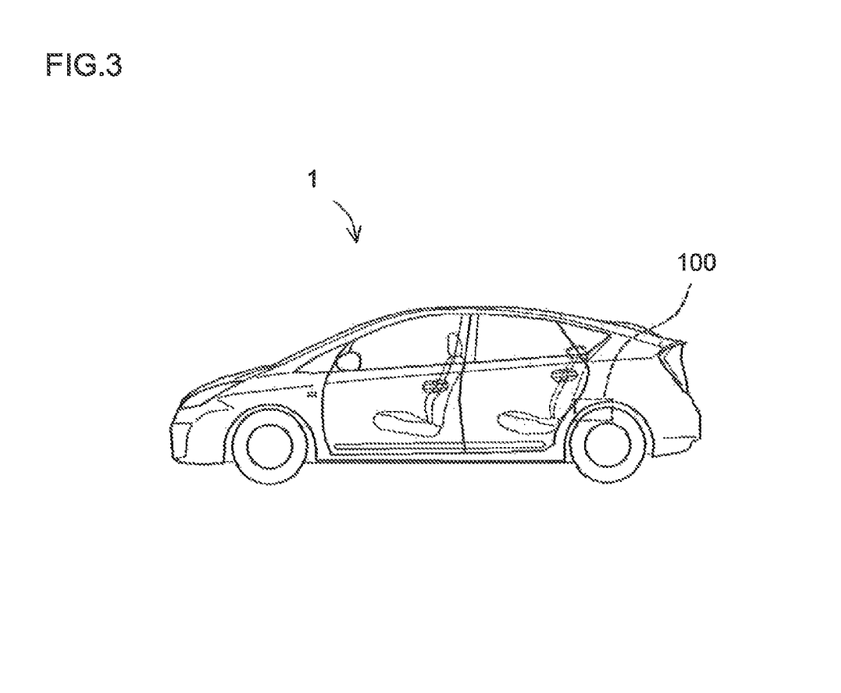
FIG. 3 shows a side view schematically illustrating a vehicle (automobile) comprising a lithium-ion secondary battery according to the present invention.

As another aspect, the present invention provides a lithium-ion secondary battery produced by a method disclosed herein. In such a battery, the internal resistance increase arising due to negative electrode properties may be effectively suppressed. In addition, as described above, because the increase in the internal resistance that occurs along with the battery use is suppressed, such a battery may exhibit excellent durability. Also, because of the simplified production procedures, it may be more cost-efficient. Thus, it is preferable, for instance, as the power source for vehicles. In other words, as shown in FIG. 3, the present invention provides a vehicle 1 comprising a lithium-ion secondary battery 100 produced by a method disclosed herein. Particularly preferable is a vehicle (e.g., an automobile) comprising such a lithium-ion secondary battery as a power source (typically, as a power source in a hybrid vehicle or an electric vehicle).

DESCRIPTION OF EMBODIMENTS

Preferred embodiments of the present invention are described below. Matters necessary to practice this invention other than those specifically referred to in this description may be understood as design matters to a person of ordinary skills in the art based on the conventional art in the pertinent field. The present invention can be practiced based on the contents disclosed in this description and common technical knowledge in the subject field.

In the lithium-ion secondary battery production method disclosed herein, as the negative electrode active material, a negative electrode active material selected according to the steps (A) to (E) is used.

The tap density $X_n$ (g/cm$^3$) in the step (A) is measured at several different number of taps applied, n(e.g., n=100, 120, 140, 160, 180, 2011, 220, 240, . . . ), While the tap density measurement device is not particularly limited, model number "TPM-3" available from Tsutsui Scientific Instruments Co., Ltd., or a similar product can be used, for instance.

Density Y (g/cm$^3$) of the dried negative electrode active material layer in the step (B) can be measured upon, with respect to each negative electrode active material having a known tap density $X_n$, forming a negative electrode active material layer on top of a negative current collector based on a prescribed negative electrode active material layer formation method. In typical, for the prescribed negative electrode active material layer formation method, the method actually employed in a prescribed negative electrode fabrication process is used. For example, when fabricating a negative electrode used as a part in a subject lithium-ion secondary battery by a process without pressing, in the step (B), a negative electrode may be fabricated similarly by a process without pressing and subjected to a negative electrode active material layer density measurement.

In the step (C), from a plot of Y versus $X_n$, can be easily determined the number of taps applied, n', that gives a regression line of Y versus tap density $X_n$: $Y=aX_n+b$; having a slope, a, of 0.5 or smaller and a coefficient of determination, $R^2$, of 0.99 or larger. For instance, such a number of taps applied, n', may be in a range of 140 to 200. When the number of taps applied is too few, the resulting tap density values may deviate by far too largely and the $R^2$ value of the regression line between the tap density and the negative electrode active material layer density may turn out smaller than 0.99, thereby possibly lowering the accuracy of the negative electrode property control using the tap densities of negative electrode active materials. When the number of taps applied is too many, if the slope a is larger than 0.5 and the tap density varied among lots within a usual range (e.g., about ±0.2, typically about ±0.1), deviations in the densities of the resulting negative electrode active material layers (even battery property deviations arising from negative electrode property deviations) may become excessively large (e.g., may become larger than ±0.1 (typically ±0.05)).

In the step (D), the prescribed range of the negative electrode active material layer density Y is preferably set around its target value Y'±0.1, or more preferably around Y'+0.05, In other words, when the slope a is about 0.5, for instance, the range (passing range) of $X_n$, capable of producing Y in such a range is preferably more or less the center value thereof ±0.2, or more preferably about the center value ±0.1.

The art disclosed herein provides a lithium-ion secondary battery production method characterized by using a negative electrode active material having a tap density at the number of taps applied n' in the $X_n$ range ($X_n$ range determined in the step (D)) described above. An embodiment of such a lithium-ion secondary battery subject to application of such a production method is described in detail with an example of a lithium-ion secondary battery 100 (FIG. 1) having a constitution where an electrode body and a non-aqueous electrolyte solution are placed in a square battery case while the art disclosed herein is not limited to such an embodiment. In other words, the shape of the lithium-ion secondary battery subject to application of the art disclosed herein is not particularly limited, and the materials, shapes, sizes, etc., of components such as the battery case, electrode body, etc., can be suitably selected in accordance with its intended use and capacity. For example, the battery case may have a cubic, flattened, cylindrical, or any other shape. In the following drawings, members and sites providing the same effect may be indicated by a common reference numeral, and redundant descriptions may be omitted or abbreviated. Moreover, the dimensional relationships (of length, width, thickness, etc.) in each drawing do not represent actual dimensional relationships.

Figure 1:
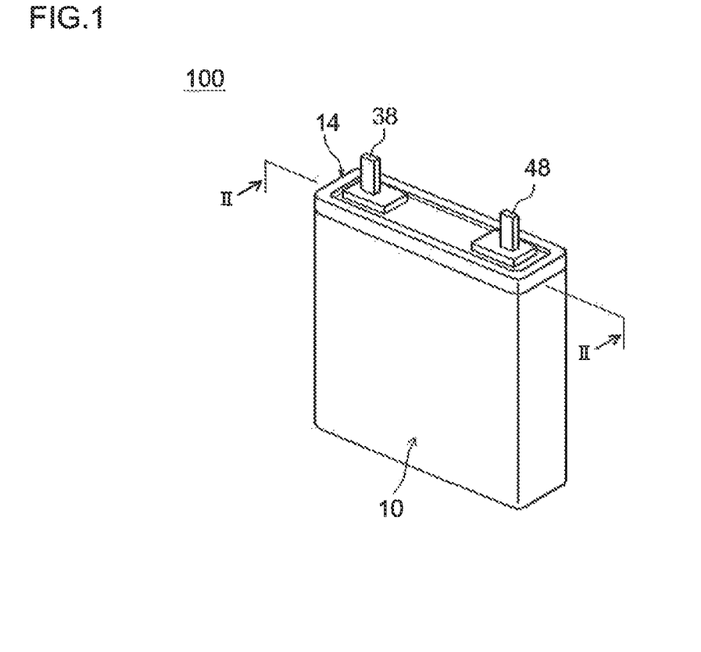
FIG. 1 shows a perspective view schematically illustrating the external form of a lithium-ion secondary battery according to an embodiment.
Figure 2:
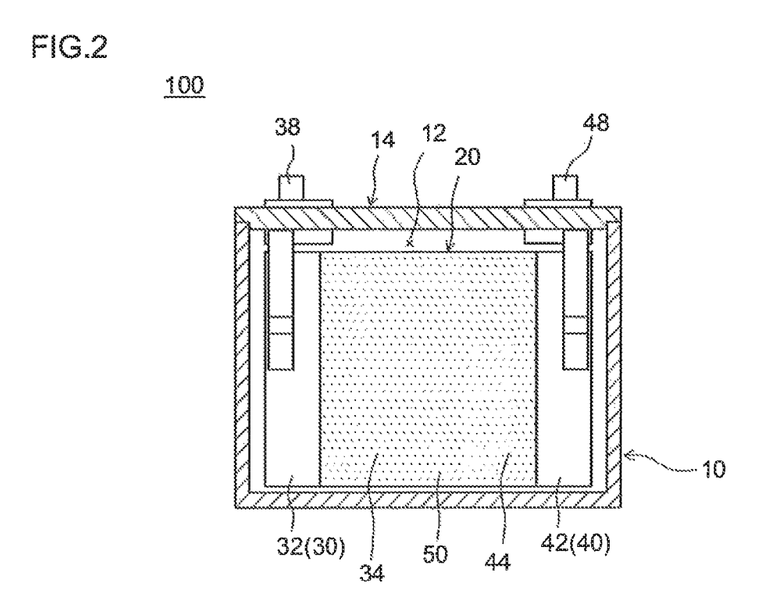
FIG. 2 shows a cross-sectional view taken along line II-II in FIG. 1.

As shown in FIG. 1 and FIG. 2, a lithium-ion secondary battery 100 can be constructed by placing a wound electrode body 20 along with an electrolyte solution not shown in the drawing via an opening 12 into a flat box-shaped battery case 10 suitable for the shape of the electrode body 20, and closing the opening 12 of the case 10 with a lid 14. The lid 14 has a positive terminal 38 and a negative terminal 48 for connection to the outside, with the terminals partially extending out from the surface of the lid 14.

The electrode body 20 is formed into a flattened shape by overlaying and winding up a positive electrode sheet 30 in which a positive electrode active material layer 34 is firmed on the surface of a long sheet of a positive current collector 32 and a negative electrode sheet 40 in which a negative electrode active material layer 44 is formed on a long sheet of a negative current collector 42 along with two long sheets of separator 50, and laterally compressing the resulting wound body.

The positive electrode Sheet 30 is formed to expose the positive current collector 32 on an edge along the sheet length direction. In other words, the positive electrode active material layer 34 is not provided on the edge or has been removed from the edge after formed. Similarly, the negative electrode sheet 40 to be wound is formed to expose the negative current collector 42 on an edge along the sheet length direction. The positive terminal 38 is joined to the exposed edge of the positive current collector 32 and the negative terminal 48 is joined to the exposed edge of the negative current collector 42, respectively, to form electrical connections with the positive electrode sheet 30 and the negative electrode sheet 40 of the flattened wound electrode body 20. The positive and negative terminals 38 and 48 can be joined to the respective positive and negative current collectors 32 and 42, for example, by ultrasonic welding, resistance welding, and so on.

As described in the steps (A) to (E), the negative electrode active material layer 44 can be formed from a negative electrode active material having a tap density that yields a negative electrode active material layer density Y in a prescribed range (having $X_n$, in a passing range). For instance, it can be preferably formed by applying to the negative current collector 42 a paste or slurry composition (negative electrode material mixture) obtained by dispersing such a negative electrode active material in a suitable solvent along with a binder and so on, and allowing the composition to dry.

As the method for applying the negative electrode material mixture to the negative current collector 42, a conventional method (typically; a coating method; e.g., a die method, a comma method, a gravure method, etc.) can be suitably employed. An especially preferable example of the coating method is a die method. According to a die method, even when no pressing step is carried out after drying, it is possible to form a negative electrode active material layer wherein both the density and the thickness in the length direction (e.g., a length of about 50 m) are more uniform. A lithium-ion secondary battery comprising a negative electrode having such a negative electrode active material layer may have more stable properties. When a die method is employed, in an embodiment omitting a pressing step after drying, it is preferable that the negative electrode material mixture has a viscosity of about 2000 cps to 7000 cps when measured at 20 rpm after a lapse, of 5 hours from the material mixture preparation. According to such a negative electrode material mixture, even without a pressing step, can be formed a negative electrode active material layer with smaller thickness deviations both in the width direction and the length direction. When the viscosity of the negative electrode material mixture is too high, at the edges of the width direction of the negative electrode sheet, the negative electrode active material layer may become too thick. When the viscosity of the negative electrode material mixture is too small, at the edges of the width direction of the negative electrode sheet, so-called sloping may occur, whereby the negative electrode active material layer may turn out too thin. In a preferable embodiment, the time period from preparation of the negative electrode material mixture to a start of applying the material mixture is 5 hours to 96 hours, In such an embodiment, the viscosity of the material mixture may stabilize, and a negative electrode active material layer having a more uniform thickness can be formed. Such an embodiment can be preferably applied, for instance, when a die method is employed for applying a negative electrode material mixture. Furthermore, for example, even when the negative electrode material mixture contains a component (carbon/methyl cellulose (CMC), etc.) that takes a relatively long time to be dissolved, such an embodiment can be preferably employed because the component is completely dissolved and the viscosity of the material mixture is stabilized.

As the negative electrode active material, one, two or more kinds of substances conventionally used in lithium-ion secondary batteries can be used without particular limitations. Examples of a preferable negative electrode active material include carbon particles. A particulate carbon material (carbon particles) at least partly comprising a graphite structure (layered structure) can be used preferably. Any carbon material among so-called graphitic substances (graphites), hard-to-graphitize carbonaceous substances (hard carbons), easy-to-graphitize carbonaceous substances (soft carbons) and substances having a structure combining these can be preferably used. The amount of the negative electrode active material contained in the negative electrode active material layer can be, for instance about 90 to 99% by mass. The art disclosed herein can be preferably employed in an embodiment using carbon particles having an average particle diameter of 5 μm to 30 μm (preferably 10 μm to 15 μm) as a negative electrode active material in particular. In the present description, "average particle diameter" refers to a median diameter (D50: 50% volume average particle diameter), which can be determined from the particle size distribution measured by a particle size distribution measurement device based on laser scattering diffractometry unless otherwise specified.

As the binder, a suitable one can be selected for use from various polymers. One kind can be used solely, or two or more kinds can be used in combination.

Examples include water-soluble polymers such as CMC, methyl cellulose (MC), cellulose acetate phthalate (CAP), hydroxypropyl methylcellulose (HPMC), hydroxypropyl methylcellulose phthalate (HPMCP), polyvinyl alcohols (PVA), etc.; water-dispersible polymers such as fluorine-based resins (polytetrafluomethylene (PTFE), tetrafluoroethylene-perfluoroalkyl vinyl ether copolymers (PFA), tetrafluoroethylene-hexalluoropropylene copolymers (FEP), ethylene-tetrafluoroethylene copolymers (ETFE), etc.), vinyl acetate copolymers, styrene-butadiene block copolymers (SBR), acrylic acid-modified SBR resins (SBR-based latexes), rubbers (gum arabic, etc.), etc.; oil-soluble polymers such as polyvinylidene fluoride (PVDF), polyvinylidene chloride (PVDC), polyethylene oxide (PEO), polypropylene oxide (PPO), polyethylene oxide-propylene oxide copolymers (PEO-PPO), etc.; and so on.

The amount of the binder added can be suitably selected in accordance with the type and amount of the negative electrode active material. For example, it can be about 1 to 10% by mass of the negative electrode active material layer.

As the negative current collector 42, can be preferably used a conductive member formed of a metal having good conductivity. For instance, copper or an alloy containing copper as the primary component can be used. The shape of the negative current collector 42 is not particularly limited as it may vary in accordance with the shape, etc., of the lithium-ion secondary battery, and it may have a variety of shapes such as a rod, plate, sheet, foil, mesh, and so on. In the present embodiment, a copper sheet is used as the negative current collector 42 and can be preferably used in a lithium-ion secondary battery 100 comprising a wound electrode body 20. In such an embodiment, for example, a copper sheet having a thickness of about 6 μm to 30 μm can be preferably used.

The positive electrode active material layer 34 can be preferably formed, for instance, by applying to the positive current collector 32 a paste or slurry composition (positive electrode material mixture) obtained by dispersing in a suitable solvent a positive electrode active material along with a conductive material, a binder, etc., as necessary; and allowing the composition to dry. The amount of positive electrode active material contained in the positive electrode active material layer can be, for instance, about 80 to 95% by mass.

As the positive electrode active material, a positive electrode material capable of storing and releasing lithium is used. One kind, or two or more kinds among substances (e.g., layered oxides and spinet oxides) conventionally used in lithium-ion secondary batteries can be used without particular limitations. Examples include lithium-containing composite oxides such as lithium-nickel composite oxides, lithium-cobalt composite oxides, lithium-manganese composite oxides, lithium-magnesium composite oxides, and the like.

Herein, the scope of the lithium-nickel composite oxide encompasses oxides containing lithium (Li) and nickel (Ni) as metal components as well as oxides containing as metal components, in addition to lithium and nickel, at least one other metal element (i.e., a transition metal element and/or a main group metal element other than Li and Ni) in a proportion roughly equal to or less than that of nickel on the number of atoms. The metal element other than Li and Ni can be, for instance, one, two or more species of metal elements selected from a group consisting of cobalt (Co), aluminum (Al), manganese (Mn), chromium (Cr), iron (Fe), vanadium (V), magnesium (Mg), titanium (Ti), zirconium (Zr), niobium (Nb), molybdenum (Mo), tungsten (W), copper (Cu), zinc (Zn), gallium (Ga), indium (In), tin (Sn), lanthanum (La), and cerium (Ce). The same applies also to the scopes of the lithium-cobalt composite oxide, the lithium-manganese composite oxide, and the lithium-magnesium composite oxide, In an embodiment of the art disclosed herein, as the positive electrode active material, a lithium-containing composite oxide containing at least Ni, Co and Mn as metal components is used. For example, can be preferably used a lithium-containing composite oxide comprising the three elements, Ni, Co and Mn, approximately in the same proportions based on the number of atoms.

Alternatively, as the positive electrode active material, can be used an olivine lithium phosphate represented by the general formula $LiMPO_4$ (wherein M is at least one or more elements among Co, Ni, Mn and Fe; e.g., $LiFePO_4$, $LiMnPO_4$).

As the conductive material, can be preferably used a powdered conductive material such as carbon powder, carbon fibers, and so on. As the carbon powder, various kinds of carbon black such as acetylene black, furnace black, Ketjen black, graphite powder and the like are preferable. One kind of conductive material can be used solely, or two or more kinds can be used in combination.

The amount of the conductive material contained in the positive electrode material mixture may be suitably selected in accordance with the kind and amount of the positive electrode active material, and for instance, it can be about 4 to 15% by mass.

As the binder, among those listed early for the negative electrode, can be used one kind alone, or two or more kinds in combination. The amount of the binder added can be suitably selected in accordance with the kind and amount of the positive electrode active material, and for instance, it can be about 1 to 5% by mass of the positive electrode material mixture.

As the positive current collector 32, can be preferably used a conductive member formed of a metal having good conductivity. For example, can be used aluminum or an alloy containing aluminum as the primary component. The shape of the positive current collector 32 is not particularly limited as it may vary in accordance with the shape, etc., of the lithium-ion secondary battery, and it may have a variety of shapes such as a rod, plate, sheet, foil, mesh, and so on. In the present embodiment, an aluminum sheet is used as the positive current collector 32 and can be preferably used in a lithium-ion secondary battery 100 comprising a wound electrode body 20. In such an embodiment, for example, an aluminum sheet having a thickness of about 10 μm to 30 μm can be preferably used.

The non-aqueous electrolyte solution comprises a supporting salt in a non-aqueous solvent (organic solvent). As the supporting salt, a lithium salt used as a supporting salt in general lithium-ion secondary batteries can be suitably selected for use. Examples of such a lithium salt include $LiPF_6$, $LiBF_4$, $LiClO_4$, $LiAsF_6$, $Li(CF_3SO_2)_2N$, $LiCF_3SO_3$, and the like. One kind of such a supporting salt can be used solely, or two or more kinds can be used in combination. $LiPF_6$ can be given as an especially preferable example. It is preferable to prepare the non-aqueous electrolyte solution to have a supporting salt concentration within a range of, for instance, 0.7 mol/L to 1.3 mol/L.

As the non-aqueous solvent, an organic solvent used in general lithium-ion secondary batteries can be suitably selected for use. Examples of especially preferable non-aqueous solvents include carbonates such as ethylene carbonate (EC), dimethyl carbonate (DMC), ethyl methyl carbonate (FMC), diethyl carbonate (DEC), vinylene carbonate (VC), propylene carbonate (PC), and so on. Among these organic solvents, one kind can be used solely, or two or more kinds can be used in combination. For example, a mixture of EC, DMC, and EMC can be preferably used.

The separator 50 is a sheet placed between the positive electrode sheet 30 and the negative electrode 40 so as to be in contact with both the positive electrode active material layer 34 of the positive electrode sheet 30 and the negative electrode active material layer 44 of the negative electrode sheet 40. It functions to prevent a short circuit associated with direct contact between the two electrode active material layers 34 and 44 on the positive electrode sheet 30 and the negative electrode sheet 40. It also functions to form conductive paths (conductive pathways) between the electrodes, with the pores of the separator 50 having been impregnated with the electrolyte solution. As such a separator 50, a conventional separator can be used without particular limitations. For example, a porous sheet of a resin (micro-porous resin sheet) can be preferably used. A porous sheet of a polyolefin resin such as polyethylene (PE), polypropylene (PP), polystyrene, etc., is preferable. In particular, can be used preferably a PE sheet, a PP sheet, a multi-layer sheet having overlaid PE and PP layers, or the like. The thickness of the separator is preferably set within a range of about 10 μm to 40 μm, for example.

The art disclosed herein provides also a lithium-ion secondary battery production method comprising the following steps:

(G) preparing a negative electrode material mixture comprising a negative electrode active material having a tap density $X_{200}$ of 0.6 g/cm³ to 0.95 g/cm³ when measured after tapped 200 times and further comprising a solvent (H) forming without a pressing step a negative electrode active material layer having a density of 0.85 g/cm³ to 1.05 g/cm³ when dried by applying the negative electrode material mixture to a negative current collector and allowing it to dry, thereby fabricating a negative electrode; and (I) constituting a lithium-ion secondary battery using the negative electrode.

According to such a method, by the simple means where a negative electrode active material is selected for use based on tap density $X_{200}$, can be stably produced a lithium-ion secondary battery in which an increase in the internal resistance (direct-current resistance, reaction resistance at a low temperature) is suppressed.

Several embodiments relevant to the present invention are described below although this is not to limit the present invention to these embodiments, In the following explanation, the terms "parts" and "%" are based on the mass unless specifically stated otherwise.

<Examples 1 to 7>

Figure 4:
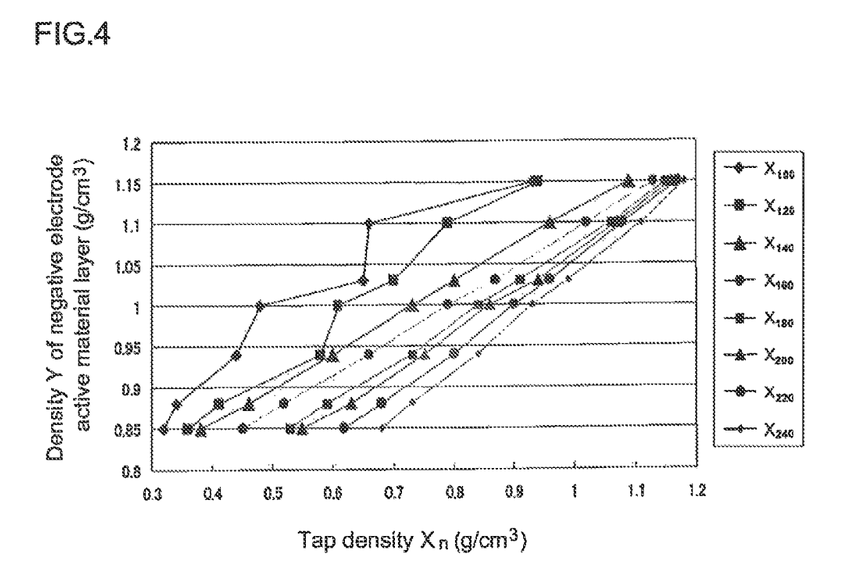
FIG. 4 shows a graph illustrating the relationship between the tap density $X_n$ of a negative electrode active material and the density Y of the corresponding negative electrode active material layer.

With respect to negative electrode active material samples S1 to S7, using a tap density measurement device (model number "TPM-3") available from Tsutsui Scientific Instruments Co., Ltd., at a tapping rate of 60 times per minute, the tap density $X_n$ was measured when the number of taps applied, n, was 100, 120, 140, 160, 180, 200, 220, 240, and 250, respectively. Using each negative electrode active material, a negative electrode was fabricated by the same method (a die method without pressing) as the one employed in the battery fabrication described later, and the density Y of the negative electrode active material layer was measured. Based on their results, for each number of taps applied, a regression line ($Y = aX_n + b$) was plotted to determine the slope, a, and the coefficient of determination, $R^2$. The results are shown in Tables 1 and 2, and a plot of regression lines is shown in FIG. 4. It is noted that when the number of taps applied reached 250, the tap density value became approximately constant for all samples. The measured $X_{250}$ values were 0.7 (S1), 0.76 (S2), 0.85 (S3), 0.96 (S4), 1 (S5), 1.11 (S6), 1.18 (S7), all in g/cm³.

TABLE 1

| Sample | $X_{100}$ (g/cm³) | $X_{120}$ (g/cm³) | $X_{140}$ (g/cm³) | $X_{160}$ (g/cm³) | $X_{180}$ (g/cm³) | $X_{200}$ (g/cm³) | $X_{220}$ (g/cm³) | $X_{240}$ (g/cm³) | Y (g/cm³) |
|---|---|---|---|---|---|---|---|---|---|
| S1 | 0.32 | 0.36 | 0.38 | 0.45 | 0.53 | 0.55 | 0.62 | 0.68 | 0.85 |
| S2 | 0.34 | 0.41 | 0.46 | 0.52 | 0.59 | 0.63 | 0.68 | 0.73 | 0.88 |
| S3 | 0.44 | 0.58 | 0.6 | 0.66 | 0.73 | 0.75 | 0.8 | 0.84 | 0.94 |
| S4 | 0.48 | 0.61 | 0.73 | 0.79 | 0.84 | 0.86 | 0.9 | 0.93 | 1 |
| S5 | 0.65 | 0.7 | 0.8 | 0.87 | 0.91 | 0.94 | 0.96 | 0.99 | 1.03 |
| S6 | 0.66 | 0.79 | 0.86 | 1.02 | 1.06 | 1.07 | 1.08 | 1.11 | 1.1 |
| S7 | 0.93 | 0.94 | 1.09 | 1.13 | 1.15 | 1.16 | 1.17 | 1.18 | 1.15 |

TABLE 2

| | $Y = aX_n + b$ | |
|---|---|---|
| n | a | $R^2$ |
| 100 | 0.4889 | 0.911 |
| 120 | 0.5358 | 0.979 |
| 140 | 0.4295 | 0.9996 |
| 160 | 0.44 | 0.9997 |
| 180 | 0.4796 | 0.9992 |
| 200 | 0.4938 | 0.9982 |
| 220 | 0.5482 | 0.9993 |
| 240 | 0.5933 | 0.9991 |

As shown in Tables 1 and 2 as well as FIG. 4, it was found that even with the same negative electrode active material sample, as the number of taps applied increased, the tap density had a tendency to increase; and the relationship between the tap density $X_n$ of the negative electrode active material at a given number n of taps applied and the density Y of a negative electrode active material layer formed from the negative electrode active material yielded a regression line that satisfied both the slope a ≤0.5 and $R^2$≥0.99 when as was between 140 and 200. On the other hand, it was found that when was fewer than 140, $R^2$ was far below 0.99, and due to the poor linearity between $X_n$ and Y, control of Y based on $X_n$ values was difficult to accomplish with high accuracy. Furthermore, it was found that when n was more than 200, because the regression line between $X_n$, and Y had a slope a exceeding 0.5, as compared to the cases Where the slope a was 0.5 or smaller, equivalent variation in $X_n$ gave rise to much larger deviations in Y.

<Examples 8 and 9>

Setting 1 g/cm³ as a target value which was the density of the negative electrode active material layer prepared with negative electrode active material sample S4 by a die method without pressing, with respect to negative electrode active material sample S8 and negative electrode active material sample S9 with $X_{140}$ and $X_{240}$ being larger by 0.1, respectively, than that of S4, negative electrodes were fabricated similarly by a die method without pressing; and the densities of the negative electrode active material layers were measured. The results are shown in Table 3.

TABLE 3

| Sample | $X_{140}$ (g/cm³) | $X_{240}$ (g/cm³) | Y (g/cm³) | Deviation from target value (g/cm³) |
|---|---|---|---|---|
| S4 | 0.73 | 0.9 | 1.00 | — |
| S8 | 0.83 | — | 1.04 | 0.04 |
| S9 | — | 1.0 | 1.055 | 0.055 |

As shown in Table 3, compared with S4, both S8 and S9 resulted in a $X_n$, deviation of +0.1. On the contrary; with respect to Y, their deviations from S4 were 0.04 g/cm³ and 0.055 g/cm³, respectively; whereby the deviation of S9 from the target value was larger by 37% or more than that of S8.

[Investigation of Coating Methods]

In the same manner as the battery fabrication described later, was prepared a negative electrode material mixture containing a negative electrode active material sample S4. The negative electrode material mixture was applied by a die method to copper foil (70 cm wide, 50 m long) having a uniform thickness (10 μm) and allowed to dry, whereby a negative electrode sheet P was fabricated without pressing. Similarly, the negative electrode material mixture was applied by a comma method to the same copper foil and allowed to dry; whereby a negative electrode sheet Q was fabricated without pressing. With respect to negative electrode sheets P and Q, the thickness (μm) of the sheet (including the thickness of copper foil) was measured every 5 m from the starting line (0 m) of coating through the finishing line (50 m) of coating. The results are shown in Table 4. In Table 4, "sheet length" indicates the distance from the starting line of coating up to the line at which a measurement of the thickness of the sheet was taken. The thickness of the sheet was measured at the center point of the width direction.

TABLE 4

| | Coating method | Sheet length (m) | | | | | |
|---|---|---|---|---|---|---|---|
| | | 0 | 5 | 10 | 15 | 20 | 25 |
| Thickness of sheet (μm) | Die | 100 | 102 | 99 | 101 | 100 | 102 |
| | Comma | 101 | 104 | 103 | 99 | 103 | 105 |

| | Coating method | Sheet length (m) | | | | | Standard Deviation |
|---|---|---|---|---|---|---|---|
| | | 30 | 35 | 40 | 45 | 50 | |
| Thickness of sheet (μm) | Die | 98 | 100 | 101 | 99 | 100 | 1.3 |
| | Comma | 107 | 101 | 96 | 102 | 105 | 3.1 |

As show in Table 4, when a negative electrode was fabricated by an embodiment without pressing, with a die method, the sheet had an approximately uniform thickness of 100±2 with a standard deviation as small as 1.3. On the contrary, with a comma method, significant local deviations (a standard deviation of 3.1) occur, with the thickness of the sheet being 96 μm to 107 μm. Based on these results, among the embodiments without pressing, application of a negative electrode material mixture by a die method led to formation of a negative electrode active material layer having a more uniform thickness.

[Change with Time Of Viscosity of Negative Electrode Material Mixture]

Negative electrode active material S4, CMC, and SBR were mixed at a mass ratio of 98:1:1 with water (solvent) to prepare a negative electrode material mixture with 50% solids content. The viscosity (cps) of the supernatant of the negative electrode material mixture was measured immediately after its preparation. While the negative electrode material mixture was stored at a temperature of 25° C. for 125 hours, change in the viscosity of the supernatant was monitored. The viscosity (cps) was measured at a temperature of 25° C. and a rotational speed of 20 rpm, using a Model B viscometer (available from TOKIMEC Company, Model BH). The results are shown in Table 5.

TABLE 5

| | Storage time (h) | | | | | | |
|---|---|---|---|---|---|---|---|
| | 0 | 3 | 5 | 24 | 29 | 48 | 53 |
| Viscosity (cps) | 1500 | 1750 | 2000 | 2000 | 2000 | 2000 | 2000 |

| | Storage time (h) | | | | | |
|---|---|---|---|---|---|---|
| | 72 | 77 | 96 | 101 | 120 | 125 |
| Viscosity (cps) | 2000 | 2000 | 2000 | 1750 | 1500 | 1000 |

As shown in Table 5, it was found that even with a negative electrode material mixture in an embodiment containing a component such as CMC that was poorly soluble in the solvent (taking a relatively long time for dissolution), the viscosity was stabilized by storing the mixture under the conditions described above for about 5 to 96 hours after its preparation. When a negative electrode active material layer is finned with a negative electrode material mixture with such a stable viscosity, it can have a more uniform thickness.

[Investigation of Viscosity of Negative Electrode Material Mixture]

Were prepared pasty material mixtures P1 to P7 containing the same solid components as the negative electrode material mixture used in the investigation of coating methods, but with varied viscosities (i.e., with varied solvent contents). With respect to each paste sample, when 5 hours had elapsed from its preparation, using a Model B viscometer (TOKIMEC Company, Model BH), the viscosity (cps) was measured at a temperature of 25° C. and a rotational speed of 20 rpm. Each of pasty material mixtures P1 to P7 after the viscosity measurement was applied by a die method to a copper sheet of 10 μm thickness and 20 cm width and allowed to dry to form a negative electrode active material layer, whereby a negative electrode sheet was fabricated without pressing. With respect to each negative electrode sheet, the thickness (μm) of the sheet was measured at the center and edges of the width direction. As the sheet thickness at the edge, the average value of the sheet thickness at the both edges was used. With respect to the negative electrode sheet according to each paste sample, the difference between the edge thickness and the center thickness is shown in Table 6 along with the state of the edge visually observed for the negative electrode active material layer.

TABLE 6

| Sample | Viscosity (cps) | Edge thickness-center thickness (μm) | State of edge |
| --- | --- | --- | --- |
| P1 | 1000 | −6 | Sloped |
| P2 | 2000 | −1 | — |
| P3 | 2750 | 0 | — |
| P4 | 3250 | 1 | — |
| P5 | 5000 | 1 | — |
| P6 | 6750 | 2 | — |
| P7 | 8000 | 5 | Greater bulk |

As shown in Table 6, with negative electrode material mixtures P2 to P6 which had viscosities in a range of 2000 cps to 7000 cps when measured under the conditions described above, when negative electrode sheets were fabricated by applying these negative electrode material mixtures by a die method, the thickness was approximately uniform (within ±2 μm) in the width direction of the negative electrode sheets. On the other hand, when a negative electrode sheet was fabricated with negative electrode material mixture P1 having a viscosity as low as 1000 cps, sloping occurred at the sheet edges of the width direction, and the thickness was found to be smaller by as much as 6 μm at the edges. When a negative electrode sheet was fabricated with negative electrode material mixture P7 with a viscosity exceeding 7000 cps, the thickness was larger by as much as 5 μm at the edges of the width direction of the sheet, and the greater bulk was visually observed as well.

[Deviations Among Lots]

With respect to several lots for each of the negative electrode active materials S8 and S9 and negative electrode active material S10, $X_{140}$, $X_{240}$, and $X_{250}$ (value after stabilize) were measured, respectively, based on the method described early; and two different lot samples were obtained for each material so that the differences in $X_{140}$, $X_{240}$, and $X_{250}$ were 0.07 g/cm$^3$, respectively. Using each sample, a negative electrode sheet was fabricated based on the method described early; and the density Y of the negative electrode active material layer was measured. With respect to each of negative electrode active materials S8, S9 and S10, the difference in Y between the two lots was determined. The results are shown in Table 7.

With respect to negative electrode active materials S8, S9 and S10, according to the procedures below; the corresponding 18650 batteries (cylindrical form of 18 mm diameter, 65 mm height) were fabricated.

As a negative electrode material mixture, a negative electrode active material, CMC and SBR were mixed at a mass ratio of 98:1:1 with ion-exchanged water to 45% NV to prepare a slurry composition. This negative electrode material mixture was applied to each face of a long copper sheet of 10 μm thickness and allowed to dry so as to obtain a total coating amount of 9.6 mg/cm$^2$ for the two faces combined, whereby a negative electrode sheet having an overall thickness of about 79 μm was obtained.

As a positive electrode material mixture, LiNi$_{1/3}$Co$_{1/3}$Mn$_{1/3}$O$_2$, acetylene black (AB) and polyvinylidene fluoride (PVDF) was mixed at a mass ratio of 85:10:5 with N-methyl-2-pyrrolidone (NMP) to 50% NV to prepare a slurry composition. This positive electrode material mixture was applied to each face of a long aluminum sheet of 15 μm thickness so as to obtain a total coating amount of 15 mg/cm$^2$ for the two faces combined. This wad dried and then pressed to an overall thickness of about 75 μm to obtain a positive electrode sheet.

As a non-aqueous electrolyte solution, using a solvent mixture containing EC, DMC and EMC at a volume ratio of 1:1:1, was prepared a LiPF$_6$ solution of 1 mol/L (1 M) concentration.

Figure 6:
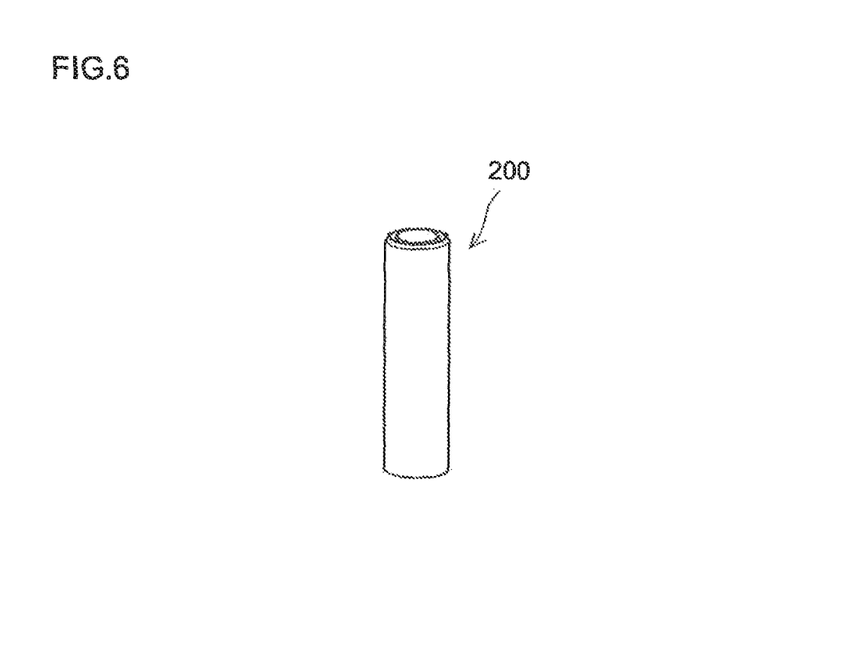
FIG. 6 shows a drawing schematically illustrating an external form of a 18650 battery.

The positive electrode sheet and the negative electrode sheet were overlaid along with two long porous polyethylene sheets of 25 μm thickness, and the layered body was wound into the length direction. The resulting wound electrode body was placed in a cylindrical case along with the non-aqueous electrolyte solution, and the case was sealed to constitute a 18650 battery 200 (FIG. 6).

Each battery was charged at a constant current (CC) rate of 1/10 C for three hours, and subsequently, charging at a rate of 1/3 C to 4.1 V and discharging at a rate of 1/3 C to 3.0 V were repeated three times for each. 1 C refers to an amount of current that allows charging of a full battery capacity (Ah) predicted from the theoretical capacity of the positive electrode in one hour.

At room temperature (23° C.), each battery adjusted to 80% SOC after conditioned was CC-discharged at a rate of 1/3 C to 0% SOC, and at the same time, the discharge capacity was measured as the initial capacity. Subsequently, the battery was adjusted to 80% SOC again at a rate. of 1/3 C and stored at 60° C. for 30 days. After this, the discharge capacity after storage was measured in the same manner as the initial capacity measurement. As the capacity retention rate (%),was determined the percentage of the discharge capacity after storage relative to the initial capacity.

TABLE 7

| Negative electrode active material | Lot No. | Tap density (g/cm$^3$) | Interlot difference in tap density (g/cm$^3$) | Y (g/cm$^3$) | Interlot difference in Y (g/cm$^3$) | Interlot difference in capacity retention rate (%) |
| --- | --- | --- | --- | --- | --- | --- |
| S8 | 1 | $X_{140}$ = 0.80 | 0.07 | 1.028 | 0.031 | 1.0 |
|  | 2 | $X_{140}$ = 0.87 |  | 1.059 |  |  |
| S9 | 1 | $X_{240}$ = 1.00 | 0.07 | 1.039 | 0.041 | 1.4 |
|  | 2 | $X_{240}$ = 1.07 |  | 1.080 |  |  |
| S10 | 1 | $X_{250}$ = 1.12 | 0.07 | 1.107 | 0.044 | 1.5 |
|  | 2 | $X_{250}$ = 1.19 |  | 1.151 |  |  |

As shown in Table 7, while S8, S9 and S10 used here bad the same interlot differences in $X_{140}$, $X_{240}$ and $X_{250}$ of 0.07g/cm$^3$, respectively, with respect to the differences in the densities Y of the resulting negative electrode active material layers, the smallest value of 0.03 g/cm$^3$ was observed for S8 for which $X_{140}$ was used as the index. The difference in Y increased when the tap density measurement was taken at an increased number of taps applied, n. More specifically, with S9 and S10 for which n was more than 200, the interlot difference in Y was larger than 0.04 g/cm$^3$, and as n was increased over this range, the interlot difference became more significant. Also with respect to the capacity retention rate, with S8 for which $X_{140}$ was used as the index, the interlot difference was as small as 1.0%. On the contrary; with S9 and S10 for which the number of taps applied, n, taken for the index was more than 200, the interlot difference in the capacity retention rate became more significant e ith an increased n.
[Internal Resistance of Battery]

With respect to negative electrode active materials S1 to S7, by the same procedures as above, the corresponding 18650 batteries were fabricated. The batteries given with the same conditioning process as above were subjected to the following measurements.
(Direct-Current Resistance)

At a temperature of 25° C., using an electrochemical impedance analyzer available from Solartron Group, Ltd., each battery adjusted to 60% SOC was subjected to an alternating-current impedance measurement by sweeping measurement frequency (0.1 Hz to 100,000 Hz). From the resulting Cole-Cole plot (distance from origin to x-intercept), the direct-current resistance (mΩ) at 25° C. was determined.
(Reaction Resistance at Low Temperature)

At a temperature of −30° C. using an electrochemical impedance analyzer available from Solartron Group, Ltd., each battery adjusted to 40% SOC was subjected to an alternating-current impedance measurement by sweeping the same measurement frequency. From the resulting Cole-Cole plot (arc portion), the reaction resistance (mΩ) at −30° C. was determined.

Figure 5:
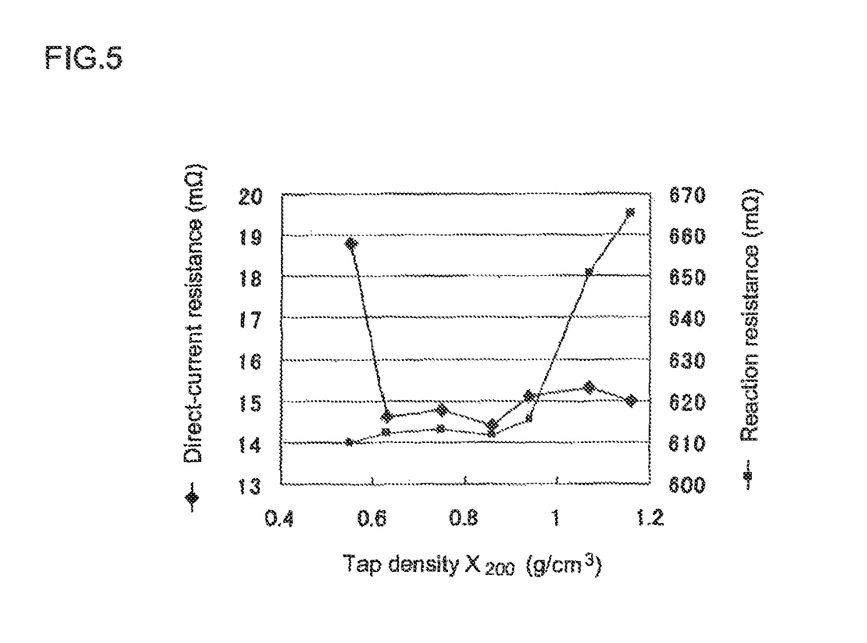
FIG. 5 shows a graph plotting the direct-current resistance and the reaction resistance of batteries versus the tap densities $X_{200}$ of negative electrode active materials.

Their results are shown in Table 8 along with the type of negative electrode active material used for each battery fabrication as well as its $X_{200}$ value and negative electrode active material layer density Y. A plot of the reaction resistance and the direct-current resistance versus $X_{200}$ is shown in FIG. 5.

TABLE 8

| Negative electrode active material | $X_{200}$ (g/cm³) | Y (g/cm³) | Direct-current resistance (mΩ) | Reaction resistance (mΩ) |
| --- | --- | --- | --- | --- |
| S1 | 0.55 | 0.85 | 18.8 | 610 |
| S2 | 0.63 | 0.88 | 14.6 | 612.2 |
| S3 | 0.75 | 0.94 | 14.8 | 613.1 |
| S4 | 0.86 | 1 | 14.4 | 611.6 |
| S5 | 0.94 | 1.03 | 15.1 | 616.5 |
| S6 | 1.07 | 1.1 | 15.3 | 651.1 |
| S7 | 1.16 | 1.15 | 15 | 665.2 |

As shown in Table 8 and FIG. 5, it was found that in a lithium-ion secondary battery constituted with a negative electrode active material with a tap density $X_{200}$ below 0.6 g/cm³, the direct-current resistance increased significantly; and in a lithium-ion secondary battery constituted with a negative electrode active material with a $X_{200}$ exceeding 0.95 g/cm³, the reaction resistance at a low temperature increased significantly. On the contrary, it was found that in a lithium-ion secondary battery with $X_{200}$ in a range of 0.6 g/cm³ to 0.95 g/cm³, increases in both the direct-current resistance and the reaction resistance were effectively suppressed.

Although specific embodiments of the present invention have been described in detail above, these are merely for illustrations and do not limit the scope of the claims. The art according to the claims includes various modifications and changes of the specific embodiments illustrated above.

REFERENCE SIGNS LIST 1 vehicle
20 wound electrode body
30 positive electrode sheet
32 positive current collector
34 positive electrode active material layer
38 positive terminal
40 negative electrode sheet
42 negative current collector
44 negative electrode active material layer
48 negative terminal
50 separator
100, 200 lithium-ion secondary battery

The invention claimed is:

1. A method for producing a lithium-ion secondary battery comprising a positive electrode, a negative electrode, and a non-aqueous electrolyte solution, with the method comprising the following steps:
    (A) with respect to several different negative electrode active materials, determining tap density $X_n$ (g/cm³) at several different number of taps applied, n, respectively;
    (B) determining density Y (g/cm³) of a negative electrode active material layer constituted with a negative electrode material mixture comprising each negative electrode active material;
    (C) based on a regression line of Y versus tap density $X_n$, $Y=aX_n+b$, determining the number of taps applied, n', at which the regression line has a slope, a, of 0.5 or smaller and a coefficient of determination, $R^2$, of 0.99 or larger;
    (D) based on a plot of a regression line $Y=a X_{n'}+b$ for the number of taps applied, n', determining a passing range of $X_{n'}$ within which negative electrode active material layer density Y is in a prescribed range;
    (E) selecting a negative electrode active material having a $X_{n'}$ in the passing range, and fabricating a negative electrode with the negative electrode active material; and
    (F) constituting a lithium-ion secondary battery using the negative electrode.

2. The lithium-ion secondary battery production method according claim 1, wherein the prescribed range of Y is 0.85 g/cm³ to 1.05 g/cm³.

3. The lithium-ion secondary battery production method according to claim 1, wherein the number of taps applied, n', is 200.

4. The lithium-ion secondary battery production method according to claim 1, wherein the passing range of $X_{n'}$ is 0.6 g/cm³ to 0.95 g/cm³.

5. The lithium-ion secondary battery production method according to claim 1, wherein the step for fabricating a negative electrode with the negative electrode active material is carried out without pressing.

6. A method for producing a lithium-ion secondary battery comprising a positive electrode, a negative electrode, and a non-aqueous electrolyte solution, the method comprising:
    (G) preparing a negative electrode material mixture comprising a negative electrode active material consisting of carbon particles and having a tap density $X_{200}$ of 0.6 g/cm³ to 0.95 g/cm³ when measured after tapped 200 times and further comprising a solvent;
    (H) forming without a pressing step a negative electrode active material layer having a density of 0.85 g/cm³ to 1.05 g/cm³ when dried by applying the negative electrode material mixture to a negative current collector and allowing it to dry, thereby fabricating a negative electrode, wherein the amount of the negative electrode active material contained in the negative electrode active material layer is 90 to 99% by mass; and
    (I) constituting a lithium-ion secondary battery using the negative electrode.

7. The method according to claim 6, wherein the negative electrode material mixture comprises carboxymethyl cellulose, and the time period from preparation of the negative electrode material mixture to a start of applying the negative electrode material mixture is 5 hours to 96 hours.

8. The method according to claim 7, wherein the negative electrode material mixture has a viscosity of about 2000 cps to 7000 cps, the viscosity being measured at 20 rpm after a lapse of 5 hours from the preparation of the negative electrode material mixture.

9. The method according to claim 8, wherein in step (H), the negative electrode material mixture is applied to the negative current collector by a die coating method.

* * * * *